UNITED STATES PATENT OFFICE.

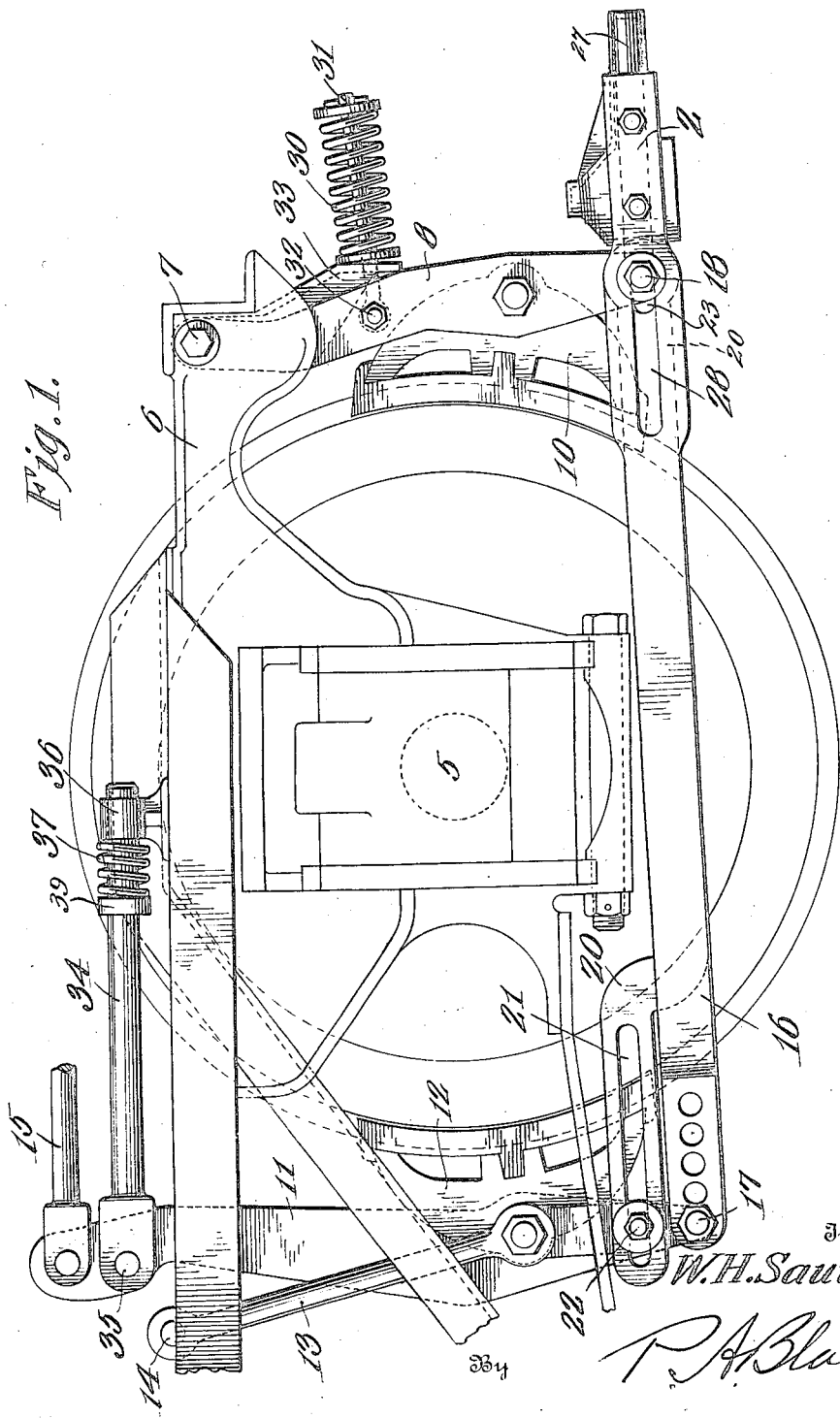

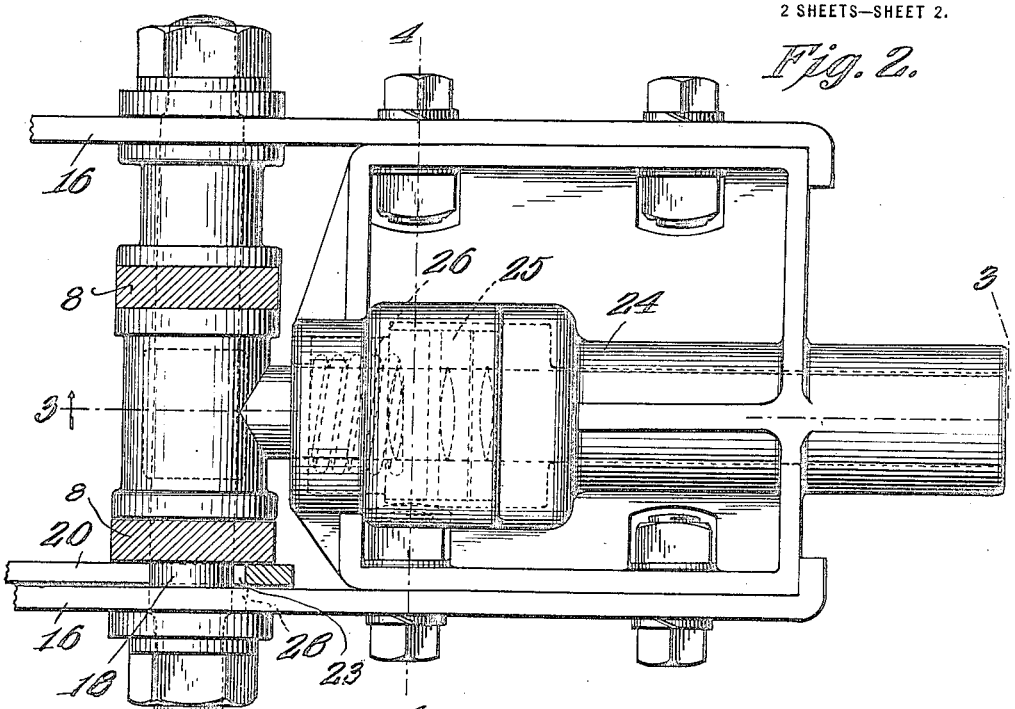
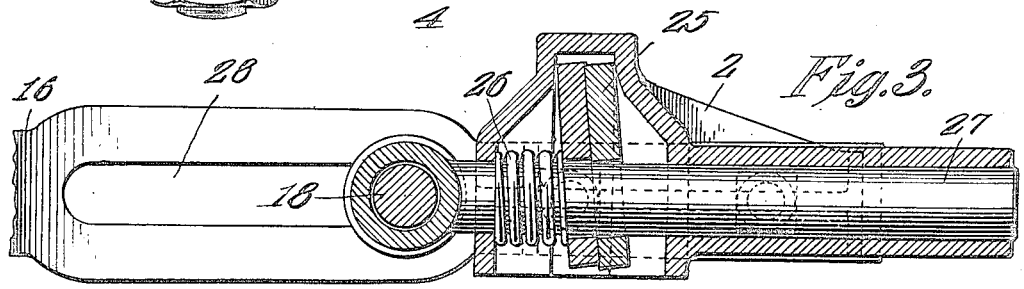
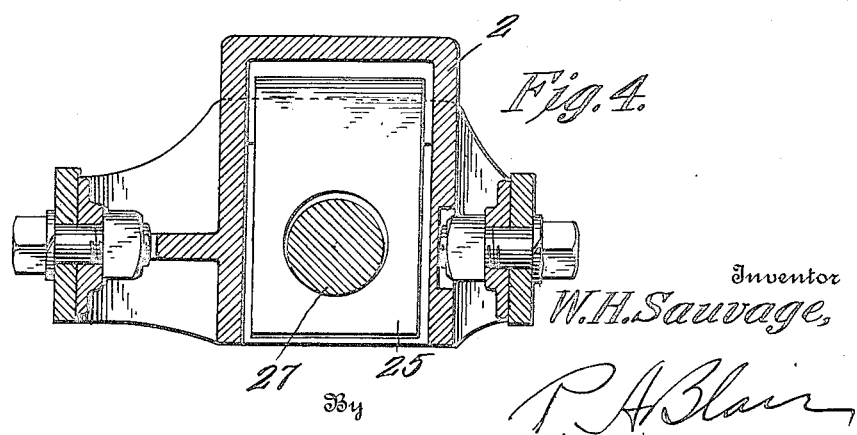

WILLIAM H. SAUVAGE, OF FLUSHING, NEW YORK, ASSIGNOR TO GOULD COUPLER COMPANY, A CORPORATION OF NEW YORK.

SLACK-ADJUSTER.

1,227,947. Specification of Letters Patent. Patented May 29, 1917.

Application filed January 25, 1916. Serial No. 74,183.

*To all whom it may concern:*

Be it known that I, WILLIAM H. SAUVAGE, citizen of the United States, and resident of Flushing, in the county of Queens and State of New York, have invented certain new and useful Improvements in Slack-Adjusters, of which the following is a specification.

This invention relates to slack adjusters, and in its more intense aspect to automatic slack adjusters particularly adapted for use in connection with brake rigging, of the clasp brake type, on railway car trucks.

One of the objects of the present invention is to provide a simple and practical automatic slack adjuster which will be reliable in use and efficient in operation. Another object is to provide a slack adjuster of the above character particularly adapted for use in connection with clasp brakes which will be exact in the operation of taking up the excess travel. A further object is to provide mechanism of the above character having relatively few parts which will be inexpensive to manufacture and install.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation, partly in section, of a portion of a car truck and such parts of the brake rigging as are necessary to fully understand the present invention.

Fig. 2 is a detail plan view partly in section of the permanent take up and holding mechanism;

Fig. 3 is a sectional view on the line 3—3, Fig. 2;

Fig. 4 is a sectional view taken on the line 4—4, Fig. 2.

Referring now to the drawings in detail and more particularly to Fig. 1, 5 denotes the axle of one set of wheels, there being two or three sets usually to a truck, mounted in a suitable frame work 6. From the point 7 at one side of the wheels is pivotally suspended a dead lever 8, carrying a brake shoe head 10 adapted to engage one side of the wheel. At the opposite side of the wheel is a live lever 11 carrying a brake shoe head 12 supported by means of a hanger 13 from a pivot point 14 on the side frame. The upper end of this live lever 11 is connected to a pull rod 15 which leads to the brake actuating mechanism. The lower end of the live lever is connected by bolts with the dead lever, or hanger 8, by a two-part tension bar 16, at the points 17 and 18 respectively. There is also an intermediate connection in the form of a bent relatively flat adjusting rod 20 having a slot 21 at one end adapted to be engaged by a yielding friction clamp device 22 mounted upon the live lever 11. The opposite end of this member 20 is provided with a lost motion slot 23 as shown more clearly in Fig. 2, through which the bolt 18 passes for the purpose of insuring brake shoe clearance.

Before going into the details of construction of the slack adjuster mechanism, it is sufficient to state that the brake mechanism comprising the pull rod 15, the dead and live levers 8 and 11 respectively, and the connecting rod 16 at the bottom, operate in substantially the usual manner, to bring the shoes carried by the brake shoe heads into engagement with the peripheries of the wheel as the pull rod 15 moves toward the right, it being understood of course that each wheel is provided with two shoes adapted to clasp the wheel therebetween. As the brake shoes wear, as well as the other parts of the brake rigging, but not to such a noticeable extent, the upper end of the live lever would move farther to the right at each actuation were the rigging not provided with a slack adjuster so positioned and arranged as to normally hold the brake shoes in proper relation with respect to the peripheries of the wheel. This is accomplished largely by a contraction of the bottom rod 16, as will now be explained.

This rod 16 is preferably of the duplex type as shown more clearly in Fig. 2, and is provided at its end with a casing 24 containing one or more dogs 25 normally held in canted position by means of a spring 26 which surrounds a take up rod 27. This rod 27 which is adapted to be acted upon by the dogs is loosely mounted upon the bolt 18, as shown.

This bolt is adapted to travel progressively along slots 28 in the sides of the member 16 as the slack is taken up. For instance, as the brake shoe carried by the head 10 wears away, the bolt 18 will move relatively toward the left along the slot 28.

A spring 30 surrounds a stud 31 pivotally mounted at the point 32 upon the dead lever 8 and reacts against a fixed support 33, to return the dead lever 8 to normal position with its shoe free from the periphery of the wheel. The live lever 11 is provided with a stud or rod 34 pivoted thereto at the point 35 and having its free end passing through an eye 36, between which eye and the live lever or a stop thereon is wound and reacts a spring 37 normally urging the live lever toward the left.

This device will operate in substantially the following manner: On application of the brakes the upper end of the live lever 11 moves toward the right and reacting through the rod 16 at the bottom tends to bring the brake shoes into engagement with the opposite sides of the wheel against the action of the return springs 30 and 37, the latter acting against a stop 39 on rod 34. If excess travel takes place exceeding that provided for by the lost motion slot 23 at the right hand end of the adjusting rod 20, then the friction clamp device 22 will be pulled toward the right along the slot 21 an amount corresponding exactly to this excess or false travel.

On release of the brakes the parts tend to return to normal position under the action of the release springs and the point 22 becomes a relatively fixed fulcrum about which the live lever turns to force the rod 16 toward the right with respect to the bolt 18, thus causing the housing to slide along the rod 27 toward the right through the openings or holes in the dogs 25. Thus the friction clamp temporarily takes up and holds the excess slack until the same may be permanently registered upon the holding device illustrated in Figs. 2, 3 and 4.

It is thus seen that the present invention provides a simple and practical automatic slack adjuster particularly adapted for use in connection with clasp brakes. The invention is accurate, reliable and efficient in use and operation, and is believed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a slack adjuster, in combination, a live lever, a dead lever, brake shoes carried thereby adapted to engage the opposite sides of a wheel, a two-part rod connecting the lower ends of said levers, a permanent take up and holding device located at the end of said rod, and an adjusting rod connecting the live and dead levers between their lower ends, said holding device including a housing having a spring held dog carried by one part of the two-part rod adapted to engage and positively bite into the other part.

2. In a slack adjuster, in combination, a live lever, a dead lever, brake shoes carried thereby adapted to engage the opposite sides of a wheel, a two-part rod connecting the lower ends of said levers, a permanent take up and holding device including a positively acting friction dog located at the end of said rod, and an adjusting rod connected with the lower ends of the live and dead levers, having a lost motion slot at one end and a yielding friction temporary take up and holding device near the other.

3. In a slack adjuster, in combination, a live lever, a dead lever, brake shoes carried thereby adapted to engage the sides of a wheel, a two-part rod connecting the lower ends of said levers, a permanent take up and holding device located at the end of said rod, an adjusting rod connected with the live and dead levers between their lower ends, said adjusting rod having a lost motion slot at one end, a yielding friction temporary take up and holding device at its other end, and restoring springs associated with both the live and dead levers respectively adapted to aid in returning the parts to normal position.

4. In a slack adjuster, in combination, a live lever, a dead lever, a two-part rod connecting the lower ends of said levers comprising an inner end member secured to one of the levers and telescoping within a housing carried by the other, positively acting dogs within said housing, and an adjusting rod connected with the dead lever at its point of connection with the inner telescopic push rod and having a yielding friction connection at its opposite end with the live lever.

5. In a slack adjuster, in combination, a live lever, a dead lever, brake shoes carried thereby adapted to engage the opposite sides of a wheel, a two-part rod connecting the lower ends of said levers, a permanent take up and holding device including a positively acting friction dog at the end of said rod, an adjusting rod connected with the lower ends of the live and dead levers, having a lost motion slot at one end and a yielding friction temporary take up and holding device at the other, and a return spring acting between a part of the truck and the upper end of one of the levers.

6. In a slack adjuster, in combination, a live lever, a dead lever, a two-part rod connecting the lower ends of said levers comprising an inner end member secured to one of the levers and telescoping within a housing carried by the other, positively acting dogs within said housing, an adjusting rod connected with the dead lever at its point of connection with the inner telescopic push rod and having a yielding friction connection at its opposite end with the live lever, and a return spring acting between a part of the truck and the upper end of one of the levers.

7. In a slack adjuster, in combination, a live lever, a dead lever, brake shoes carried thereby adapted to engage the opposite sides of a wheel, a two part rod connecting the lower ends of said levers, a permanent take up and holding device acting between the effective ends of said parts including a positively acting friction dog carried by one part and engaging the other, an adjusting rod connected with the lower ends of the live and dead levers and substantially parallel to said first mentioned rod having a lost motion slot at one end and a temporary take up and holding device at the other, and spring means adapted to return the parts to normal position on release of the braking power.

Signed at New York in the county of New York and State of New York this 16th day of December A. D. 1915.

WILLIAM H. SAUVAGE.